Patented Nov. 6, 1951

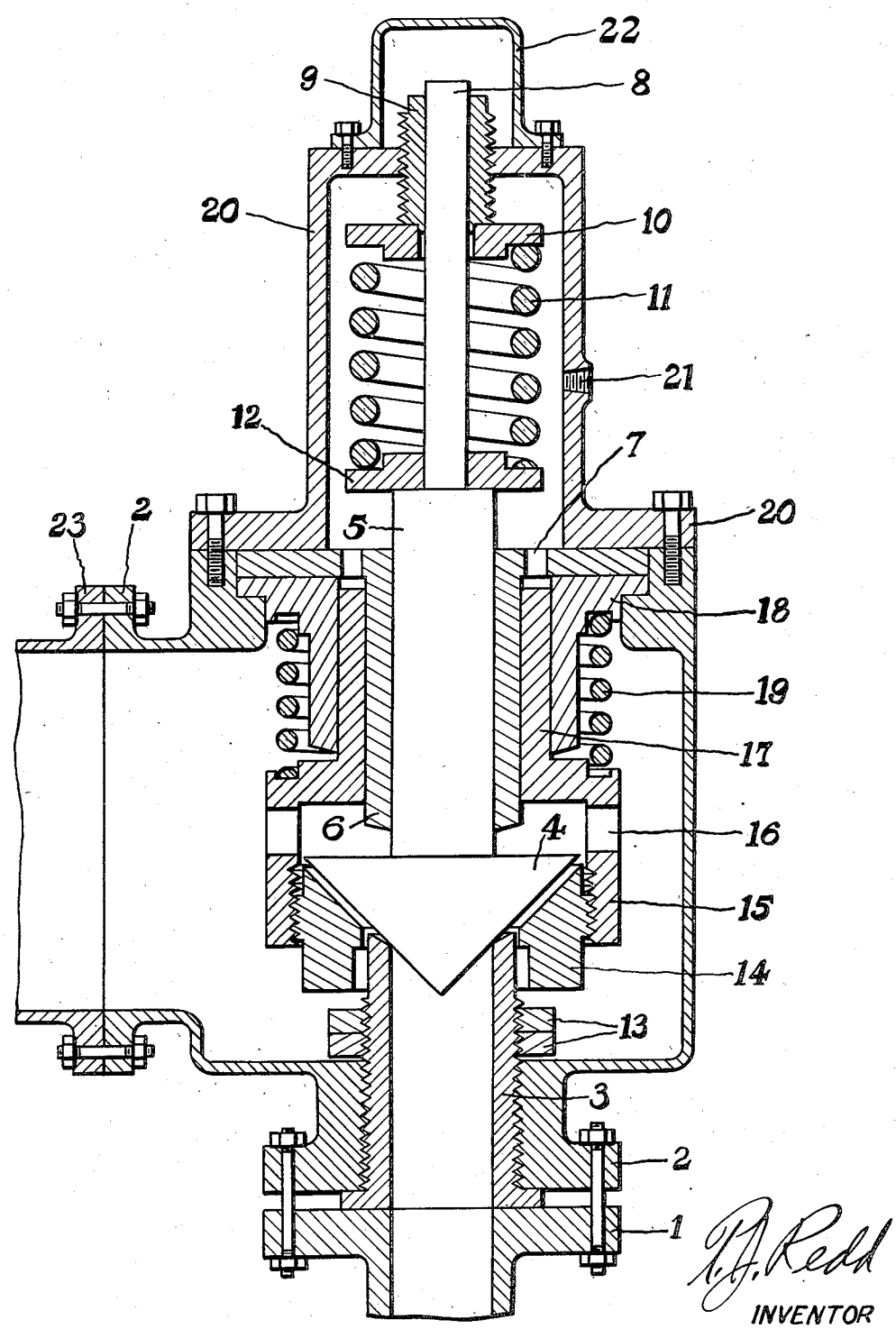

2,574,061

UNITED STATES PATENT OFFICE 2,574,061

BACK PRESSURE SAFETY VALVE

Thomas J. Redd, Tulsa, Okla.

Application February 26, 1949, Serial No. 78,656

5 Claims. (Cl. 137—53)

My invention relates to improvements in safety and relief valves which are to operate against back pressure, which is pressure in the outlet of the valve. This pressure may be caused by the pressure of the system into which the outlet of the valve is connected or may be created by the fluids which pass out of the valve when it is operating to relieve the pressure of another system. Back pressure may be constant or variable in value.

I attain the objects of my invention by the mechanism illustrated on the accompanying drawing which is a cross section of my improved valve together with the connection of the valve to the system.

In the drawing item 1 is the outlet connection of the system it is desired to relieve of pressure, 2 is the base of the valve assembly, 3 is the valve seating member which conveys fluid into the valve assembly, 4 is the valve disc which has a lower surface forming the valve with the valve seating member and thence extending outwardly from the valve seating member, 5 is the valve disc guiding surface which has a sliding fit with the valve disc guide 6 wherein are the ports 7—7, 8 is the valve spindle which extends slidably through the adjusting screw 9, the adjusting screw 9 bears on the top spring washer 10 which compresses the spring 11 against the bottom spring washer 12. Spring washer 12 presses against the top of the valve disc guiding surface 5 to control the set pressure of the valve. Items 13—13 are the adjusting nuts which engage the valve seating member 3 by means susceptible of manual adjustment and limit the downward travel of the adjusting ring 14, the adjusting ring 14 is peripherially disposed to but does not contact the valve seating member 3 and the adjusting ring has an outwardly extending surface member formed in its upper part, 15 is the adjusing ring cage which in its lower part receives the adjusting ring 14 by means susceptible of manual adjustment whereby the position of the adjusting ring relative to the adjusting ring cage may be manipulated, and the adjusting ring cage has in its central part vent means 16—16, 17 is a piston section preferably tubular which can move up or down in the fixed cylindrical means formed by valve disc guide 6 and the outer guide 18. The outer guide 18 receives the top of spring 19, and spring 19 acts to resist the upward movement of the sub-assembly formed by 14, 15, 16 and 17. The valve disc guide 6 and the outer guide are held into the valve base 2 by the bonnet 20 containing the hole 21 and the bonnet cap 22. The exhaust system 23 connects to the valve assembly base by attachment to the valve assembly outlet opening.

In carrying out my invention I provide a valve disc guiding surface 5 whose cross sectional area is equal to the valve area so that pressure in the valve base outlet will exert no net force on the valve disc. I then provide an adjusting ring sub-assembly 14, 15, 16 and 17 which moves up when back pressure in the valve assembly outlet increases as this pressure will bear against the lower side of the tubular piston 17 in greater amount whereas the pressure on the upper face of said piston has not increased. Ports 7—7 convey the pressure from the outside of the valve assembly to the upper face of the tubular piston in conjunction with the hole 21. The spring 19 opposes the upward movement of the sub-assembly formed by 14, 15, 16 and 17 and the amount of movement is roughly proportional to the back pressure value. If back pressure decreases the spring 19 will force the adjusting ring sub-assembly downward. The uppermost position of the adjusting ring sub-assembly is at contact with the bottom of outer guide 18 and the adjusting nuts 13—13 limit the downward travel. The adjusting ring sub-assembly is shown on the drawing in an intermediate position.

The valve action at the condition of high back pressure is as follows.

When the pressure in the valve seating member is sufficient to raise the valve disc 4 off of the valve seating member 3, fluid flows through the valve and into the annular conical space formed by the valve disc and the surface member of the adjusting ring 14, which surface is frustro conical in shape. The annular conical space is very small by reason of the adjusting ring sub-assembly having been raised by the high back pressure and the higher pressure from the valve seating member does not escape so rapidly from the space, causing the valve disc to rise to its proper lift.

At low pressure in the valve assembly outlet the action of the valve is according to the following:

When the pressure in the valve seating member is sufficient to raise the valve disc 4 off of the valve seating member 3, fluid flows through the valve and into the annular conical space as before in the previous example but now the annular conical space is larger since the adjusting ring sub-assembly has taken a lower position and the high pressure from the valve seating member escapes more rapidly, preventing excessive lift and a long blowing period.

By making the proper adjustments of the adjusting nuts and also the adjusting ring, the lift of the valve at the relieving condition may be made to increase with back pressure or to decrease with back pressure or remain approximately constant with back pressure and be automatic in all functions named.

In accordance with the provisions of the patent statute I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. In a safety and relief valve assembly having inlet and outlet openings, the combination with a valve seating member, a resiliently held valve disc forming the valve with said valve seating member, and said valve disc having an outwardly extending surface to intercept the fluid flow from the valve, and a resiliently held adjusting ring, said adjusting ring peripherially disposed to but not contacting the valve seating member, and said adjusting ring having a surface member oppositely disposed to the outwardly extending surface of said valve disc and forming a passage therewith for fluid flow from the valve, and vent means connecting said passage with the valve assembly outlet opening, and a piston section, said piston section connecting to the adjusting ring, and said piston section slidably engaged in fixed cylindrical means, and port means in the said cylindrical means communicating fluid pressure from the outside of the said valve assembly to the upper face of the said piston section, and the fluid back pressure in the valve assembly outlet opening being led to the opposite face of the said piston section.

2. In a safety and relief valve assembly having inlet and outlet openings, the combination with a valve seating member, a resiliently held valve disc, said valve disc having a lower surface forming the valve with said valve seating member and thence extending outwardly from the valve seating member, and a resiliently held adjusting ring, said adjusting ring peripherially disposed to but not contacting the valve seating member, and said adjusting ring having in its upper part an outwardly extending surface member oppositely disposed to said outward extension of the lower surface of the valve disc and forming a passage therewith for fluid flow from the valve, and an adjusting ring cage, said adjusing ring cage in its lower part receiving the adjusting ring, and said adjusting ring cage having in its central part vent means connecting said fluid flow passage to the valve assembly outlet opening, and a piston section, said piston secttion in its lower part connecting to the upper part of the adjusting ring cage, and said piston section slidably engaged in fixed cylindrical means, and port means in the upper part of the fixed cylindrical means communicating fluid pressure from the outside of the said valve assembly to the upper face of the piston section, and the fluid back pressure in the valve assembly outlet opening being led to the lower face of the piston section by said vent means.

3. In a safety and relief valve assembly having inlet and outlet openings, the comination with a valve seating member, a resiliently held valve disc, said valve disc having a lower surface forming the valve with said valve seating member and thence extending outwardly from the valve seating member, and a resiliently held adjusting ring, said adjusting ring peripherially disposed to but not contacting the valve seating member, and said adjusting ring having in its upper part an outwardly extending surface member oppositely disposed to the outward extension of the lower surface of the valve disc and forming a fluid passage therewith for fluid flow from the valve, and an adjusting ring cage, said adjusting ring cage in its lower part receiving the adjusting ring, and said adjusting ring cage having in its central part vent means connecting said fluid flow passage to said valve assembly outlet opening, and a tubular piston section, said tubular piston section connecting in its lower part to the upper part of said adjusing ring cage, and said tubular piston section slidably engaged in fixed cylindrical means, and port means in the upper part of the fixed cylindrical means communicating fluid pressure from the outside of the valve assembly to the upper face of the tubular piston section, and the fluid back pressure in the valve assembly outlet opening being led to the lower face of said piston section by said vent means.

4. In a safety and relief valve assembly having inlet and outlet openings, the combination with a valve seating member, a resiliently held valve disc, said valve disc having a lower surface forming the valve with the valve seating member and thence extending outwardly from the valve seating member, and a resiliently held adjusting ring, said adjusting ring peripherially disposed to but not contacting the valve seating member, and said adjusting ring having in its upper part an outwardly extending surface member oppositely disposed to said outward extension of the lower surface of the valve disc and forming a passage therewith for fluid flow from the valve, and an adjusting ring cage, said adjusting ring cage in its lower part receiving the adjusting ring by means susceptible of manual adjustment, and said adjusting ring cage having in its central part vent means connecting said fluid flow passage to the valve assembly outlet opening, and a piston section, said piston section connecting in its lower part to the upper part of the adjusting ring cage, and said piston section slidably engaged in fixed cylindrical means, and port means in the upper part of the fixed cylindrical means communicating fluid pressure from the outside of the valve assembly to the upper face of the piston section, and the fluid pressure in the valve assembly outlet opening being led to the lower face of the piston section by said vent means.

5. In a safety and relief valve assembly having inlet and outlet openings, the combination as claimed in claim 2, and a stop nut means, said stop nut means connected to said valve seating member by means susceptible of manual adjustment whereby said stop nut means may be manipulated to limit the downward travel of said adjusting ring.

T. J. REDD.

REFERENCES CITED

The following references are of record in the file of this patent:

UNITED STATES PATENTS

| Number | Name | Date |
|---|---|---|
| 328,830 | De Witt | Oct. 20, 1885 |
| 773,641 | Hayden | Nov. 1, 1904 |
| 870,526 | Bossert | Nov. 5, 1907 |
| 1,668,075 | Hellwig | May 1, 1928 |
| 1,949,150 | Eplett | Feb. 27, 1934 |
| 2,261,461 | Falls | Nov. 4, 1941 |